(12) United States Patent
Lin et al.

(10) Patent No.: US 11,255,826 B1
(45) Date of Patent: Feb. 22, 2022

(54) SUPERFICIAL FOREIGN BODIES DETECTING SYSTEM FOR ULTRASONIC SENSOR

(71) Applicant: TUNG THIH ELECTRONIC CO., LTD., Taoyuan (TW)

(72) Inventors: Chi-Sheng Lin, Taoyuan (TW); Hung-Hsuan Lin, Taoyuan (TW)

(73) Assignee: TUNG THIH ELECTRONIC CO., LTD., Taoyuan (TW)

( * ) Notice: Subject to any disclaimer, the term of this patent is extended or adjusted under 35 U.S.C. 154(b) by 0 days.

(21) Appl. No.: 17/132,822

(22) Filed: Dec. 23, 2020

(30) Foreign Application Priority Data

Nov. 18, 2020 (TW) .................................. 109140300

(51) Int. Cl.
*G01N 29/34* (2006.01)
(52) U.S. Cl.
CPC .................................. *G01N 29/34* (2013.01)
(58) Field of Classification Search
CPC .................................................... G01N 29/34
See application file for complete search history.

(56) References Cited

U.S. PATENT DOCUMENTS

2018/0009218 A1* 1/2018 Tamura ................ B41J 2/04563
2020/0361203 A1* 11/2020 Ku ....................... B41J 2/04581

* cited by examiner

*Primary Examiner* — Xin Y Zhong

(57) ABSTRACT

A superficial foreign bodies detecting system for ultrasonic sensor is disclosed. The system comprises a micro controller which comprises a main controlling unit, a driving signal generating unit, a signal receiving unit, and a residual vibration detecting unit. The driving signal generating unit is controlled by the main controlling unit so as to transmit a first sensor driving signal to the ultrasonic sensor, thereby making the sensing head to output an ultrasonic wave. In case of the transmission of the first sensor driving signal is stopped, the residual vibration detecting unit is enabled to apply a residual vibration measuring process to the ultrasonic sensor. Consequently, according to a residual vibration signal received from the residual vibration detecting unit, the main controlling unit is able to judge whether there is at least one foreign body attached on the surface of the sensing head.

7 Claims, 5 Drawing Sheets

SUPERFICIAL FOREIGN BODIES DETECTING SYSTEM FOR ULTRASONIC SENSOR

BACKGROUND OF THE INVENTION

1. Field of the Invention

The present invention relates to the technology field of ultrasonic sensors, and more particularly to a superficial foreign bodies detecting system for ultrasonic sensor.

2. Description of the Prior Art

Ultrasonic sensor is known to be used for measuring distance and detecting the presence of an object without making physical contact by producing ultrasonic wave emitted to the object and then monitoring an ultrasonic echo. Nowadays, ultrasonic sensors have been implemented in various systems, including park assist system, liquid level detection system, clean robot system, liquid atomization system, and ultrasonic flowmeter.

FIG. 1A, FIG. 1B, and FIG. 1C all show a stereo diagram of a sensing head of a conventional ultrasonic sensor. During normal operation, as FIG. 1A shows, the ultrasonic sensor is controlled by a microcontroller so as to emit an ultrasonic wave and receive a reflected ultrasonic wave by a sensing head 11a thereof. As FIG. 1B shows, there are some foreign bodies attached on the surface of the sensing head 11a after the ultrasonic sensor is used for a period of time, such as water stains, dust and filth. It should be understood that, the attached foreign bodies certainly influence the normal vibration of the sensing head 11a, thereby leading the vibration performance of the ultrasonic sensor to be different from an original anticipated. As a result, the foreign bodies attached on the surface of the sensing head 11a lower the sensitivity and/or the sensing accuracy of the ultrasonic sensor. More seriously, as FIG. 1C shows, the ultrasonic sensor may be subject to failure due to surficial cracks of the sensing head 11a caused by the impact of an external force.

From above descriptions, it is understood that, there is a need to develop a device or system that is has functionally of superficial foreign bodies detecting and removing for ultrasonic sensor. Accordingly, inventors of the present application have made great efforts to make inventive research and eventually provided a superficial foreign bodies detecting system for ultrasonic sensor.

SUMMARY OF THE INVENTION

The primary objective of the present invention is to disclose a superficial foreign bodies detecting system for application in a specific system using at least one ultrasonic sensor, so as to detect whether at least one foreign body is attached on the surface of a sensing head of the ultrasonic sensor. The superficial foreign bodies detecting system principally comprises a micro controller, which comprises a main controlling unit, a driving signal generating unit, a signal receiving unit, and a residual vibration detecting unit. During a normal working operation, the driving signal generating unit is controlled by the main controlling unit so as to transmit a first sensor driving signal to the ultrasonic sensor, thereby making the sensing head to output an ultrasonic wave. Moreover, in case of the transmission of the first sensor driving signal is stopped, the residual vibration detecting unit is enabled to apply a residual vibration measuring process to the ultrasonic sensor. As a result, according to a residual vibration signal received from the residual vibration detecting unit, the main controlling unit is able to judge whether there is at least one foreign body attached on the surface of the sensing head.

In order to achieve the primary objective of the present invention, inventors of the present invention provides an embodiment for the superficial foreign bodies detecting system, which is applied in a specific system using at least one ultrasonic sensor, and comprises a microcontroller for being coupled to the ultrasonic sensor; wherein the microcontroller comprises:

a main controlling unit;

a driving signal generating unit, being coupled to the main controlling unit and the ultrasonic sensor;

a signal receiving unit, being coupled to the ultrasonic sensor; and a residual vibration detecting unit, being coupled to the signal receiving unit and the main controlling unit;

wherein after the main controlling unit receives an enable signal, the main controlling unit controlling the driving signal generating unit to generate and transmit a first sensor driving signal to the ultrasonic sensor, thereby making a sensing head of the ultrasonic sensor be driven to emit a ultrasonic wave;

wherein in case of a transmission of the first sensor driving signal being stopped, the residual vibration detecting unit being enabled to apply a residual vibration parameter acquiring process to the ultrasonic sensor for obtaining at least one residual vibration parameter, so as to make the main controlling unit subsequently judge whether there are foreign bodies attached on a surface of the sensing head based on the residual vibration parameter.

In one embodiment, during the residual vibration parameter acquiring process, the residual vibration detecting unit firstly receives a residual vibration signal from the sensing head via the signal receiving unit, and subsequently completes a signal process of the residual vibration signal for obtaining the residual vibration parameter.

In case of the sensing head is detected to have the foreign bodies on the surface thereof, the main controlling unit controls the driving signal generating unit to generate and transmit a second sensor driving signal to the ultrasonic sensor, thereby making the sensing head of the ultrasonic sensor be driven to complete a foreign bodies removing operation.

In one embodiment, after the foreign bodies removing operation is completed, the residual vibration detecting unit is enabled to apply the residual vibration parameter acquiring process to the ultrasonic sensor again, so as to make the main controlling unit subsequently determine whether the surface of the sensing head are still attached with the foreign bodies or not.

In a practicable embodiment, the main controlling unit further comprises an abnormal situation notifying unit for generating and transmitting an abnormal situation notification to a host device of the specific system in case of the sensing head being detected to still have the foreign bodies on the surface thereof. The specific system is selected from the group consisting of park assist system, liquid level detection system, clean robot system, liquid atomization system, and ultrasonic flowmeter.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a superficial foreign bodies detecting system for ultrasonic sensor disclosed by the present invention, embodiments of the present invention will be described in detail with reference to the attached drawings hereinafter.

Figure 1A:
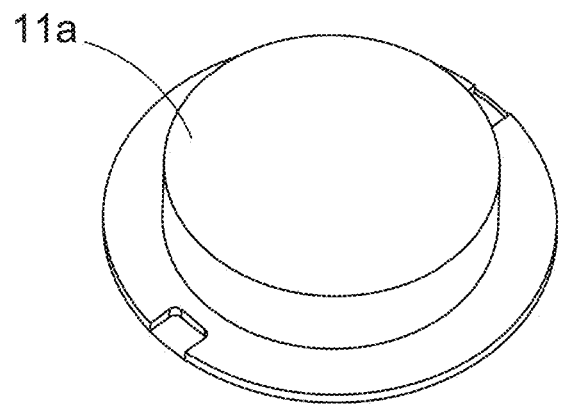
FIG. 1A shows a stereo diagram of a sensing head of a conventional ultrasonic sensor.
Figure 1B:
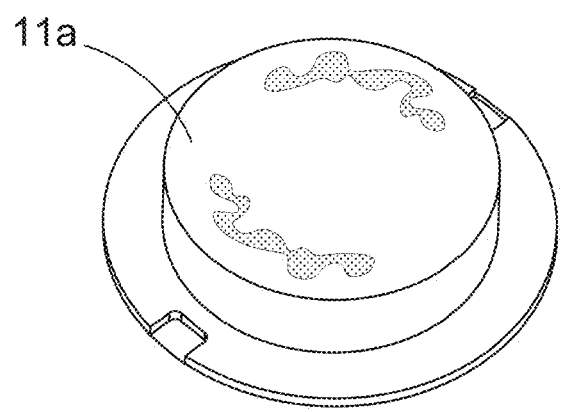
FIG. 1B shows a stereo diagram of the sensing head of the conventional ultrasonic sensor.
Figure 1C:
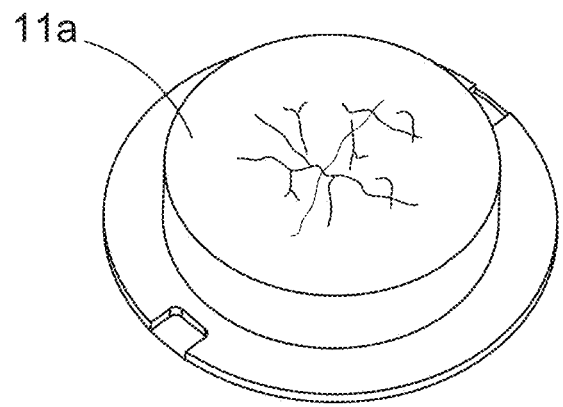
FIG. 1C shows a stereo diagram of the sensing head of the conventional ultrasonic sensor.
Figure 2:
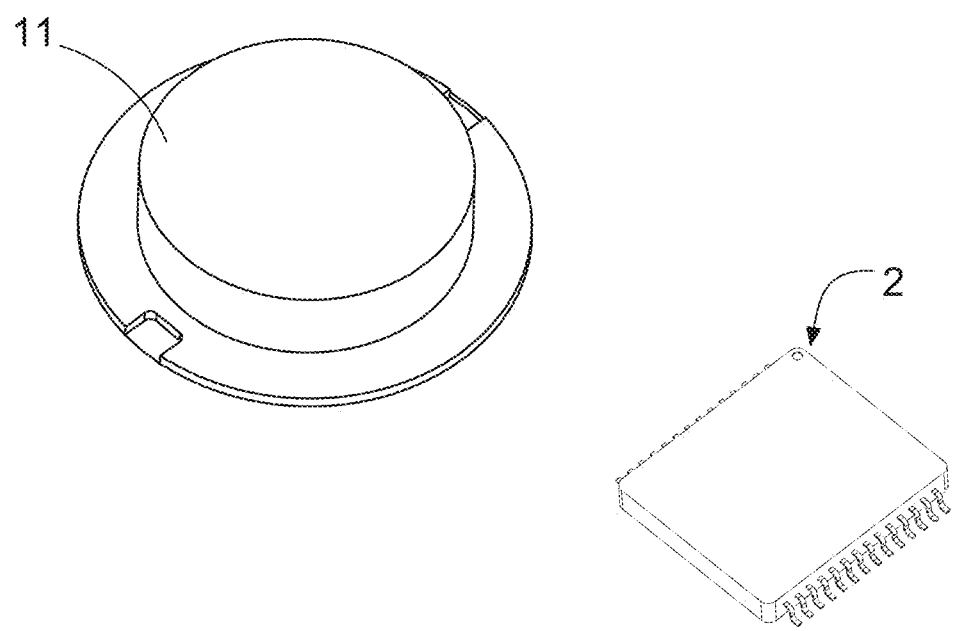
FIG. 2 shows a stereo diagram of a sensing head of a conventional ultrasonic sensor and a superficial foreign bodies detecting system according to the present invention.
Figure 3:
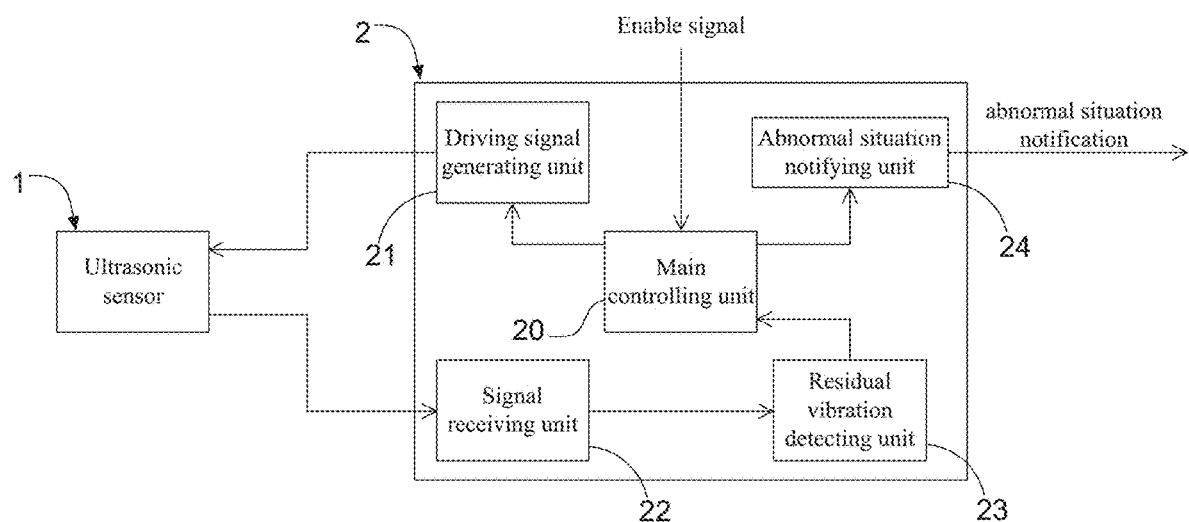
FIG. 3 shows a block diagram of the superficial foreign bodies detecting system according to the present invention.

With reference to FIG. 2, which illustrates a stereo diagram of a sensing head of a conventional ultrasonic sensor and a superficial foreign bodies detecting system according to the present invention. Moreover, FIG. 3 shows a block diagram of the superficial foreign bodies detecting system according to the present invention. The present invention discloses a superficial foreign bodies detecting system for application in a specific system using at least one ultrasonic sensor 1. The superficial foreign bodies detecting system principally comprises a microcontroller 2 for being coupled to the ultrasonic sensor 1, and the microcontroller 2 comprises a main controlling unit 20, a driving signal generating unit 21, a signal receiving unit 22, a residual vibration detecting unit 23, and an abnormal situation notifying unit 24.

Figure 4:
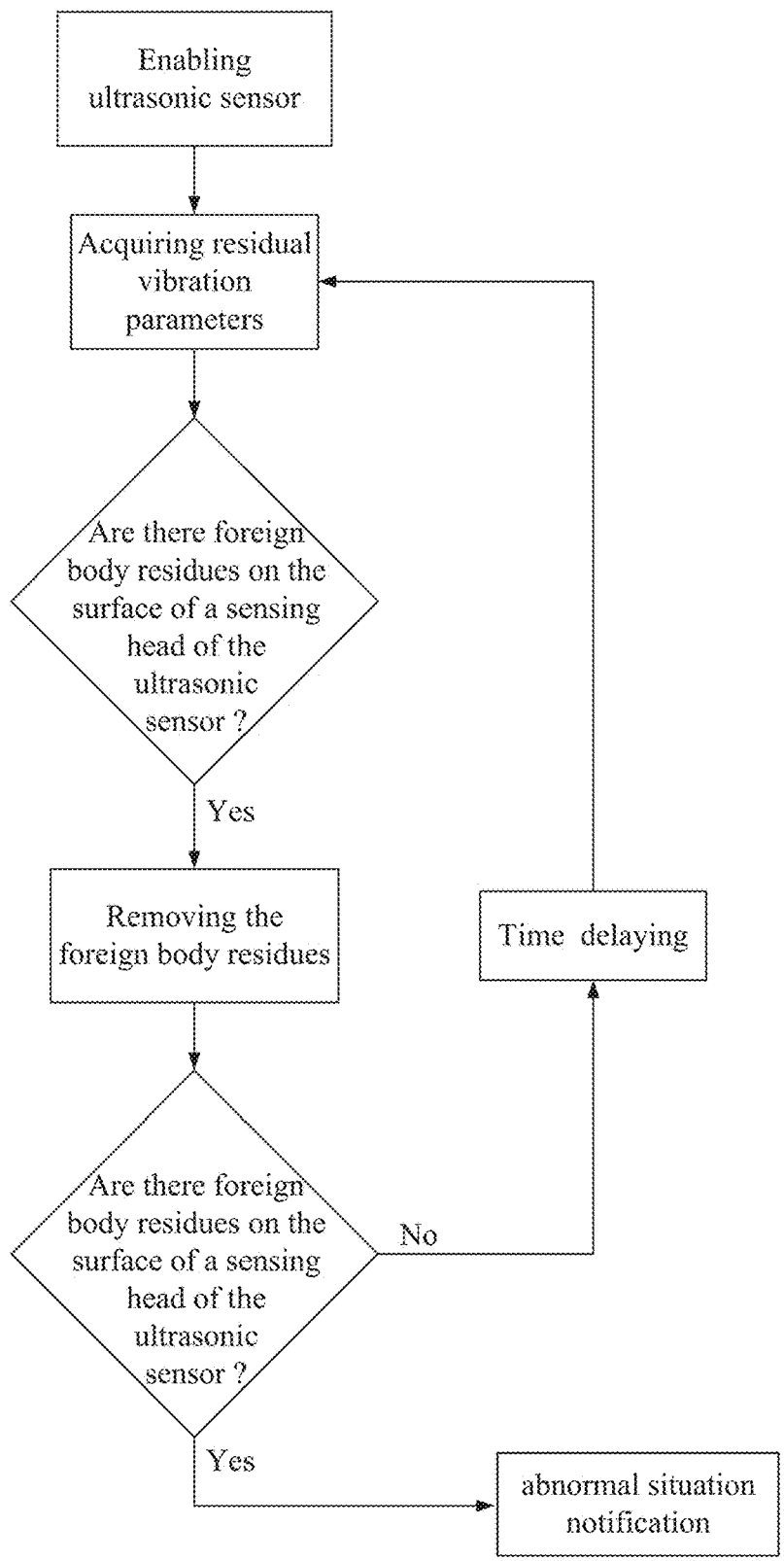
FIG. 4 shows a flowchart diagram for describing a working steps of the superficial foreign bodies detecting system according to the present invention.

FIG. 4 shows a flowchart diagram for describing a working steps of the superficial foreign bodies detecting system according to the present invention. As FIG. 3 and FIG. 4 show, the driving signal generating unit 21 is coupled to the main controlling unit 20 and the ultrasonic sensor 1, the signal receiving unit 22 is coupled to the ultrasonic sensor 1, and the residual vibration detecting unit 23 is coupled to the signal receiving unit 22 and the main controlling unit 20. According to the particular design of the present invention, after the main controlling unit 20 receives an enable signal, the main controlling unit 20 controls the driving signal generating unit 21 to generate and transmit a first sensor driving signal to the ultrasonic sensor 1, thereby making a sensing head of the ultrasonic sensor 1 be driven to emit a ultrasonic wave. Subsequently, in case of a transmission of the first sensor driving signal is stopped, the residual vibration detecting unit 23 is enabled to apply a residual vibration parameter acquiring process to the ultrasonic sensor 1 for obtaining at least one residual vibration parameter, so as to make the main controlling unit 20 subsequently judge whether there are foreign bodies attached on a surface of the sensing head 11 based on the residual vibration parameter.

Figure 5:
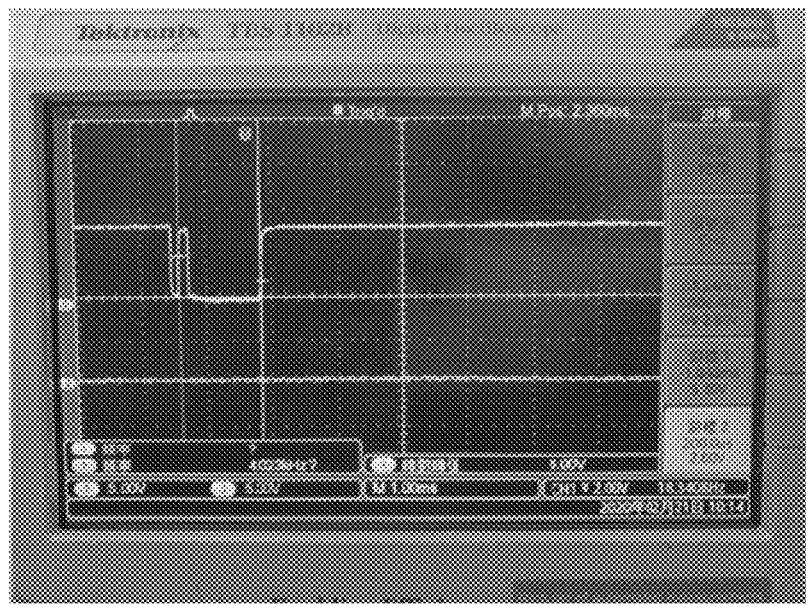
FIG. 5 shows an oscilloscope image for showing a residual vibration signal that is measured from the ultrasonic sensor having the sensing head with a clean surface.
Figure 6:
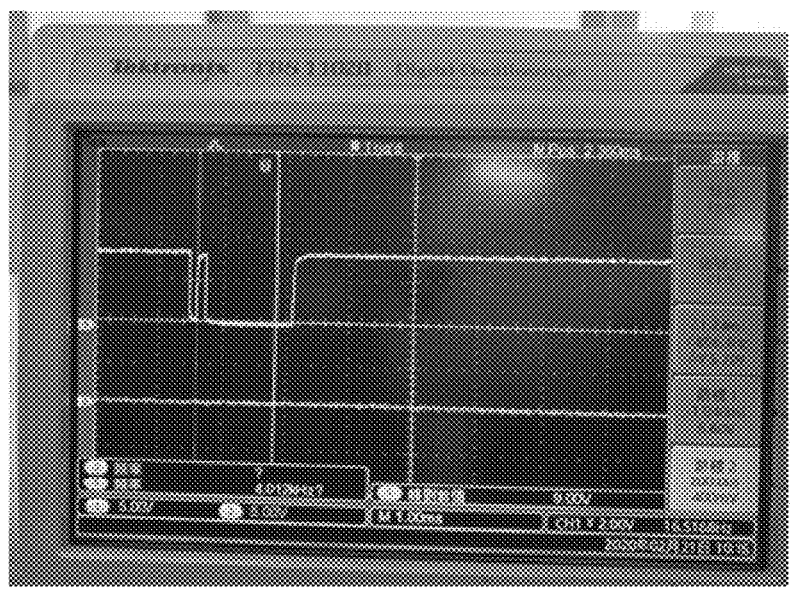
FIG. 6 shows an oscilloscope image for showing a residual vibration signal that is measured from the ultrasonic sensor having the sensing head that attached with at least one surficial foreign body.

As explained in more detail below, during the residual vibration parameter acquiring process, the residual vibration detecting unit 23 firstly receives a residual vibration signal from the sensing head 11 via the signal receiving unit 22, and then completes a signal process of the residual vibration signal for obtaining the residual vibration parameter. FIG. 5 shows an oscilloscope image for showing a residual vibration signal that is measured from the ultrasonic sensor 1 having the sensing head 11 with a clean surface, and FIG. 6 shows an oscilloscope image for showing a residual vibration signal that is measured from the ultrasonic sensor 1 having the sensing head 11 that attached with at least one surficial foreign body. From FIG. 5 and FIG. 6, it is able to know that the foregoing signal process can be a waveform comparison process applied to the two residual vibration signals. After completing the waveform comparison process, comparison result indicates that, the residual vibration signal measured from the ultrasonic sensor 1 having the sensing head 11 that attached with at least one surficial foreign body, has a low-level width wider than that of the residual vibration signal measured from the ultrasonic sensor 1 having the sensing head 11 with a clean surface. Therefore, in a practicable embodiment, the forgoing residual vibration parameter can be, but not limited to the low-level width of the residual vibration signal.

Please refer to FIG. 3 and FIG. 4 again. According to the particular design of the present invention, in case of the sensing head 11 is detected to have the foreign bodies on the surface thereof, the main controlling unit 20 controls the driving signal generating unit 21 to generate and transmit a second sensor driving signal to the ultrasonic sensor 1, thereby making the sensing head 11 of the ultrasonic sensor 1 be driven to complete a foreign bodies removing operation. As explained in more detail below, during the foreign bodies removing operation, the sensing head 11 is driven to complete at least one intermittent vibration, so as to get rid of the foreign bodies from the surface thereof.

After the foreign bodies removing operation is completed, as FIG. 3 and FIG. 4 show, the residual vibration detecting unit 23 is enabled to apply the residual vibration parameter acquiring process to the ultrasonic sensor 1 again, so as to make the main controlling unit 20 subsequently determine whether the surface of the sensing head 11 are still attached with the foreign bodies or not. According to the particular design of the present invention, the main controlling unit 20 further comprises an abnormal situation notifying unit 24 for generating and transmitting an abnormal situation notification to a host device of the specific system in case of the sensing head 11 being detected to still have the foreign bodies on the surface thereof. It is understood that, relevant personnel is able to receive the abnormal situation notification through a display unit of the host device, so as to manually remove the foreign bodies from the surface of the sensing head 11.

In a practicable embodiment, the specific system can be a park assist system, a liquid level detection system, a clean robot system, a liquid atomization system, or an ultrasonic flowmeter. Moreover, the microcontroller 2 can be integrated in the host device of the specific system.

The above description is made on embodiments of the present invention. However, the embodiments are not intended to limit scope of the present invention, and all equivalent implementations or alterations within the spirit of the present invention still fall within the scope of the present invention.

What is claimed is:

1. A superficial foreign bodies detecting system, being applied in a specific system using at least one ultrasonic sensor, and comprising a microcontroller for being coupled to the ultrasonic sensor; wherein the microcontroller comprises:

a main controlling unit;

a driving signal generating unit, being coupled to the main controlling unit and the ultrasonic sensor;

a signal receiving unit, being coupled to the ultrasonic sensor; and a residual vibration detecting unit, being coupled to the signal receiving unit and the main controlling unit;

wherein after the main controlling unit receives an enable signal, the main controlling unit controlling the driving signal generating unit to generate and transmit a first sensor driving signal to the ultrasonic sensor, thereby making a sensing head of the ultrasonic sensor be driven to emit a ultrasonic wave;

wherein in case of a transmission of the first sensor driving signal being stopped, the residual vibration detecting unit being enabled to apply a residual vibration parameter acquiring process to the ultrasonic sensor for obtaining at least one residual vibration parameter, so as to make the main controlling unit subsequently judge whether there are foreign bodies attached on a surface of the sensing head based on the residual vibration parameter;

wherein in case of the sensing head being detected to have the foreign bodies on the surface thereof, the main controlling unit controlling the driving signal generating unit to generate and transmit a second sensor driving signal to the ultrasonic sensor, thereby making the sensing head of the ultrasonic sensor be driven to complete a foreign bodies removing operation.

2. The superficial foreign bodies detecting system of claim 1, wherein during the residual vibration parameter acquiring process, the residual vibration detecting unit firstly receiving a residual vibration signal from the sensing head via the signal receiving unit, and subsequently completing a signal process of the residual vibration signal for obtaining the residual vibration parameter.

3. The superficial foreign bodies detecting system of claim 1, wherein during the foreign bodies removing operation, the sensing head being driven to complete at least one intermittent vibration, so as to get rid of the foreign bodies from the surface thereof.

4. The superficial foreign bodies detecting system of claim 1, wherein after the foreign bodies removing operation is completed, the residual vibration detecting unit being enabled to apply the residual vibration parameter acquiring process to the ultrasonic sensor again, so as to make the main controlling unit subsequently determine whether the surface of the sensing head are still attached with the foreign bodies or not.

5. The superficial foreign bodies detecting system of claim 4, wherein the main controlling unit further comprises an abnormal situation notifying unit for generating and transmitting an abnormal situation notification to a host device of the specific system in case of the sensing head being detected to still have the foreign bodies on the surface thereof.

6. The superficial foreign bodies detecting system of claim 5, wherein the microcontroller is integrated in the host device of the specific system.

7. The superficial foreign bodies detecting system of claim 5, wherein the specific system is selected from the group consisting of park assist system, liquid level detection system, clean robot system, liquid atomization system, and ultrasonic flowmeter.

* * * * *